US012097599B2

(12) United States Patent
Wu et al.

(10) Patent No.: US 12,097,599 B2
(45) Date of Patent: Sep. 24, 2024

(54) DUSTPROOF MAGAZINE FOR NAIL GUN

(71) Applicant: BASSO INDUSTRY CORP., Taichung (TW)

(72) Inventors: Jian-Rung Wu, Taichung (TW); Rui-Wen Wu, Taichung (TW)

(73) Assignee: Basso Industry Corp., Taichung (TW)

( * ) Notice: Subject to any disclaimer, the term of this patent is extended or adjusted under 35 U.S.C. 154(b) by 113 days.

(21) Appl. No.: 18/098,357

(22) Filed: Jan. 18, 2023

(65) Prior Publication Data

US 2023/0226674 A1 Jul. 20, 2023

(30) Foreign Application Priority Data

Jan. 20, 2022 (TW) .................................. 111102480

(51) Int. Cl.
*B25C 1/00* (2006.01)

(52) U.S. Cl.
CPC .................................... *B25C 1/005* (2013.01)

(58) Field of Classification Search
CPC .................................. B25C 1/00; B25C 1/005
USPC .......................................................... 227/120
See application file for complete search history.

(56) References Cited

U.S. PATENT DOCUMENTS 4,688,710 A 8/1987 Massari, Jr. et al.
2004/0132354 A1* 7/2004 Nayrac ..................... B25C 7/00 439/894
2016/0129573 A1* 5/2016 Anstett ................... E04F 21/22 227/148
2021/0354275 A1* 11/2021 Ji ............................ B25C 5/161

* cited by examiner

*Primary Examiner* — Praachi M Pathak
(74) *Attorney, Agent, or Firm* — Burris Law, PLLC

(57) ABSTRACT

A dustproof magazine to be mounted in a nail gun including a muzzle unit includes a magazine body, a nail-pressing member, and a scroll spring connected therebetween. The magazine body includes spaced-apart first and second rail walls extending transverse to the muzzle unit, and disposed respectively distal from and adjacent to the muzzle unit. The nail-pressing member is mounted movably along and between the first and second rail walls, and includes a main body and a scraper set extending therefrom. Movement of the nail-pressing member away from the muzzle unit drives the scroll spring to resiliently convert from a winding state into an unwinding state, where a strip portion of the scroll spring unwinds and extends along the second rail wall. The scraper set is in contact with the strip portion during the movement of the nail-pressing member for scrapping foreign matters off the strip portion.

9 Claims, 7 Drawing Sheets

DUSTPROOF MAGAZINE FOR NAIL GUN

CROSS-REFERENCE TO RELATED APPLICATION

This application claims priority to Taiwanese invention Patent Application No. 111102480, filed on Jan. 20, 2022.

FIELD

This disclosure relates to a nail magazine for a nail gun, and more particularly to a dustproof magazine.

BACKGROUND

Referring to FIG. 1, a pneumatic nail gun 1, which is disclosed in U.S. Pat. No. 4,688,710, generally includes a muzzle unit 11, a conventional magazine 12 that is connected to the muzzle unit 11 and that receives a plurality of nails (not shown) therein, a nail-pressing member 13 that is for pressing the nails into the muzzle unit 11, and a scroll spring 14 that is connected between the conventional magazine 12 and the nail-pressing member 13. The muzzle unit 11 has a nail-discharging outlet 111 for discharging the nails that are pressed into the muzzle unit 11 by the nail-pressing member 13. The scroll spring 14 biases the nail-pressing member 13 to slide toward the nail-discharging outlet 111 of the muzzle unit 11.

However, when the pneumatic nail gun 1 is aimed upwardly with the conventional magazine 12 loaded with the nails, a portion of the scroll spring 14 may unwind and extend on a rail surface 121 of the conventional magazine 12 that faces upwardly, and foreign matters such as dust may fall and accumulate on the portion of the scroll spring 14 and the rail surface 121 during a nail-striking process of the pneumatic nail gun 1. Consequently, the nail-pressing member 13 may not smoothly slide toward the muzzle unit 11 and thus may adversely affect the nail-striking process.

SUMMARY

Therefore, an object of the disclosure is to provide a dustproof magazine device that can alleviate at least one of the drawbacks of the prior art.

According to the disclosure, a dustproof magazine adapted to be mounted in a nail gun is provided. The nail gun includes a muzzle unit that extends in a first direction and that has a nail-discharging outlet. The dustproof magazine includes a magazine body, a nail-pressing member, and a scroll spring. The magazine body is adapted for receiving a plurality of nails therein, and includes a first rail wall and a second rail wall that are spaced apart from each other in the first direction, that extend in a second direction transverse to the first direction, and that are adapted to be disposed respectively distal from and adjacent to the nail-discharging outlet of the muzzle unit in the first direction. The nail-pressing member is mounted between the first rail wall and the second rail wall, is movable along an axis that extends in the second direction, and is adapted to press the nails into the muzzle unit. The nail-pressing member includes a main body and a first scraper set that extends from the main body. The scroll spring is connected between the magazine body and the nail-pressing member for biasing the nail-pressing member to move toward the muzzle unit, and includes a first end portion that is connected to the nail-pressing member, a second end portion that is opposite to the first end portion and that is connected to the second rail wall, and a strip portion that is disposed between the first end portion and the second end portion. Movement of the nail-pressing member away from the muzzle unit drives the scroll spring to resiliently convert from a winding state into an unwinding state, where the strip portion unwinds and extends along the second rail wall. Conversion of the scroll spring from the unwinding state into the winding state by a restoring force of the scroll spring moves of the nail-pressing member toward the muzzle unit. The first scraper set is in contact with the strip portion during the movement of the nail-pressing member for scrapping foreign matters off the strip portion.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
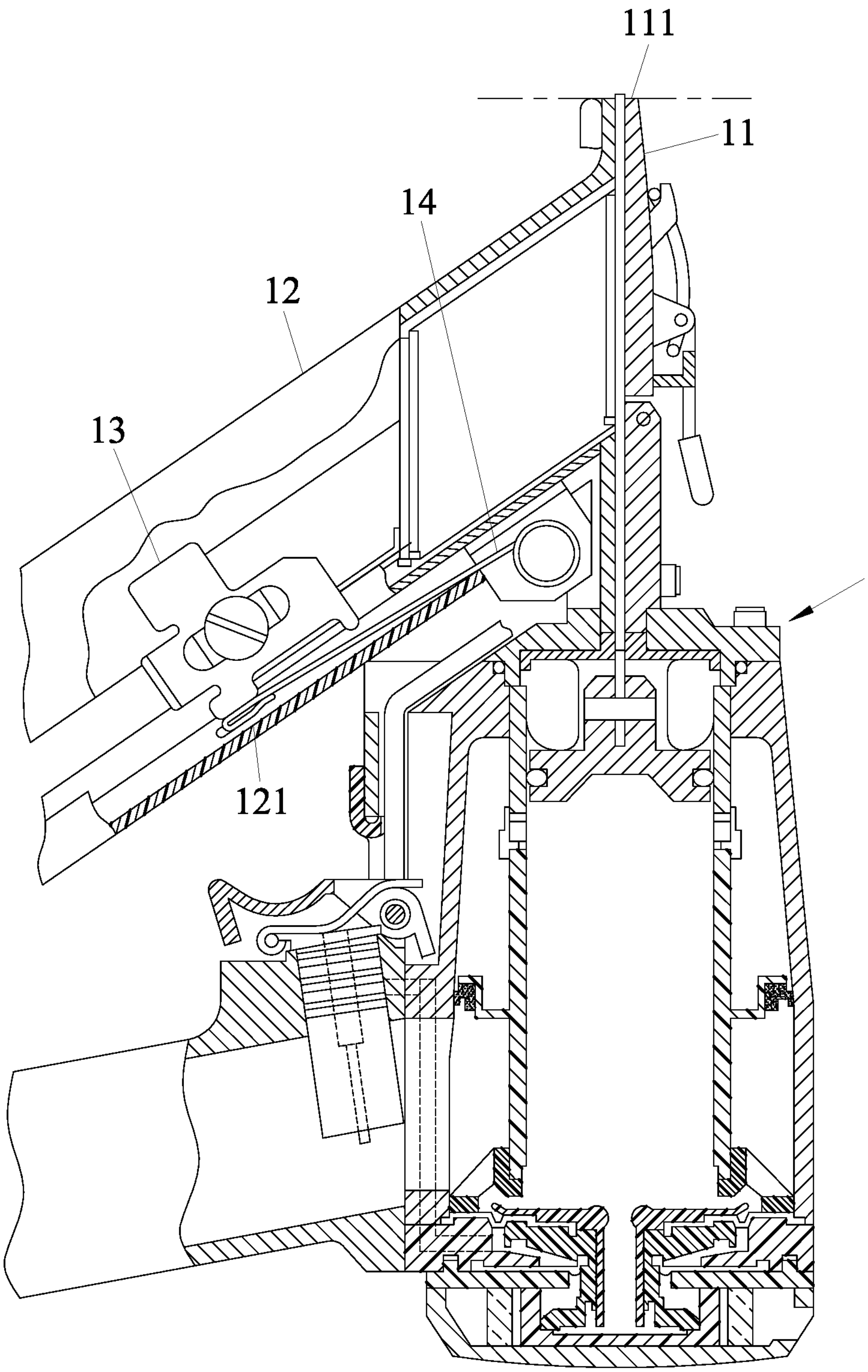
FIG.1 PRIOR ART
FIG. 1 is a fragmentary sectional view illustrating a pneumatic nail gun disclosed in U.S. Pat. No. 4,688,710.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
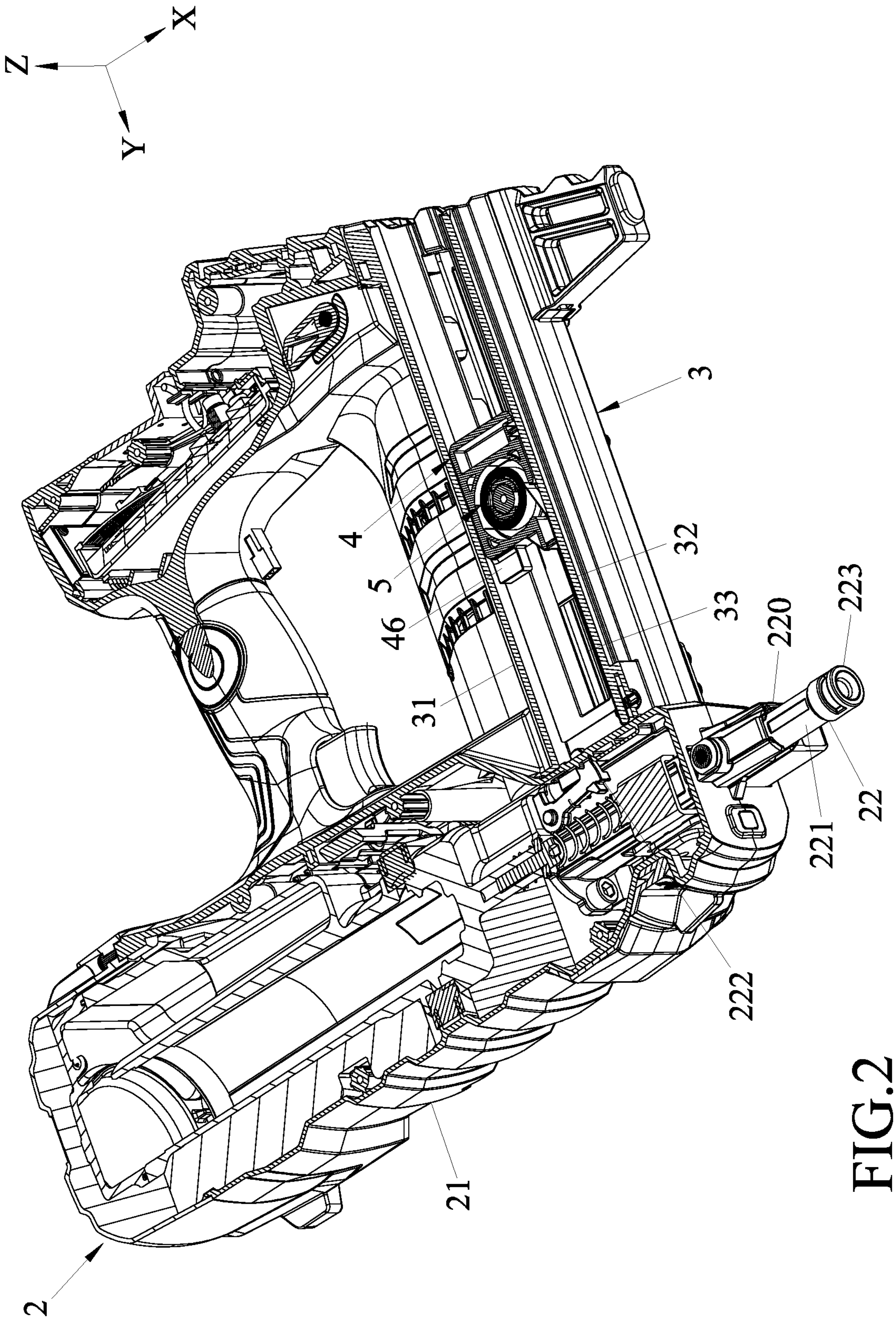
FIG. 2 is a cutaway perspective view, illustrating an embodiment of a dustproof magazine according to the present disclosure being mounted in a nail gun.
Figure 3:
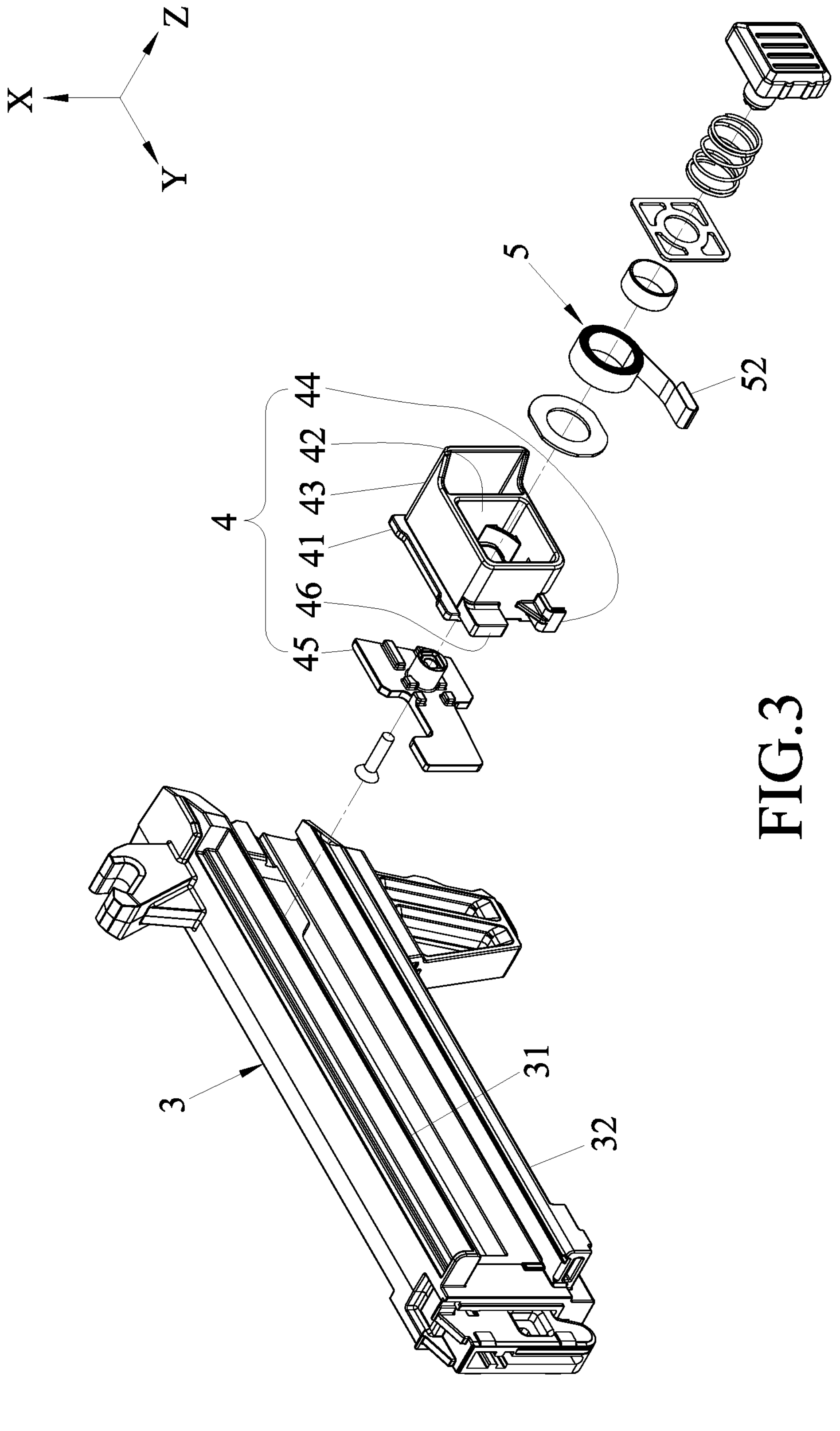
FIG. 3 is an exploded perspective view of the embodiment.
Figure 4:
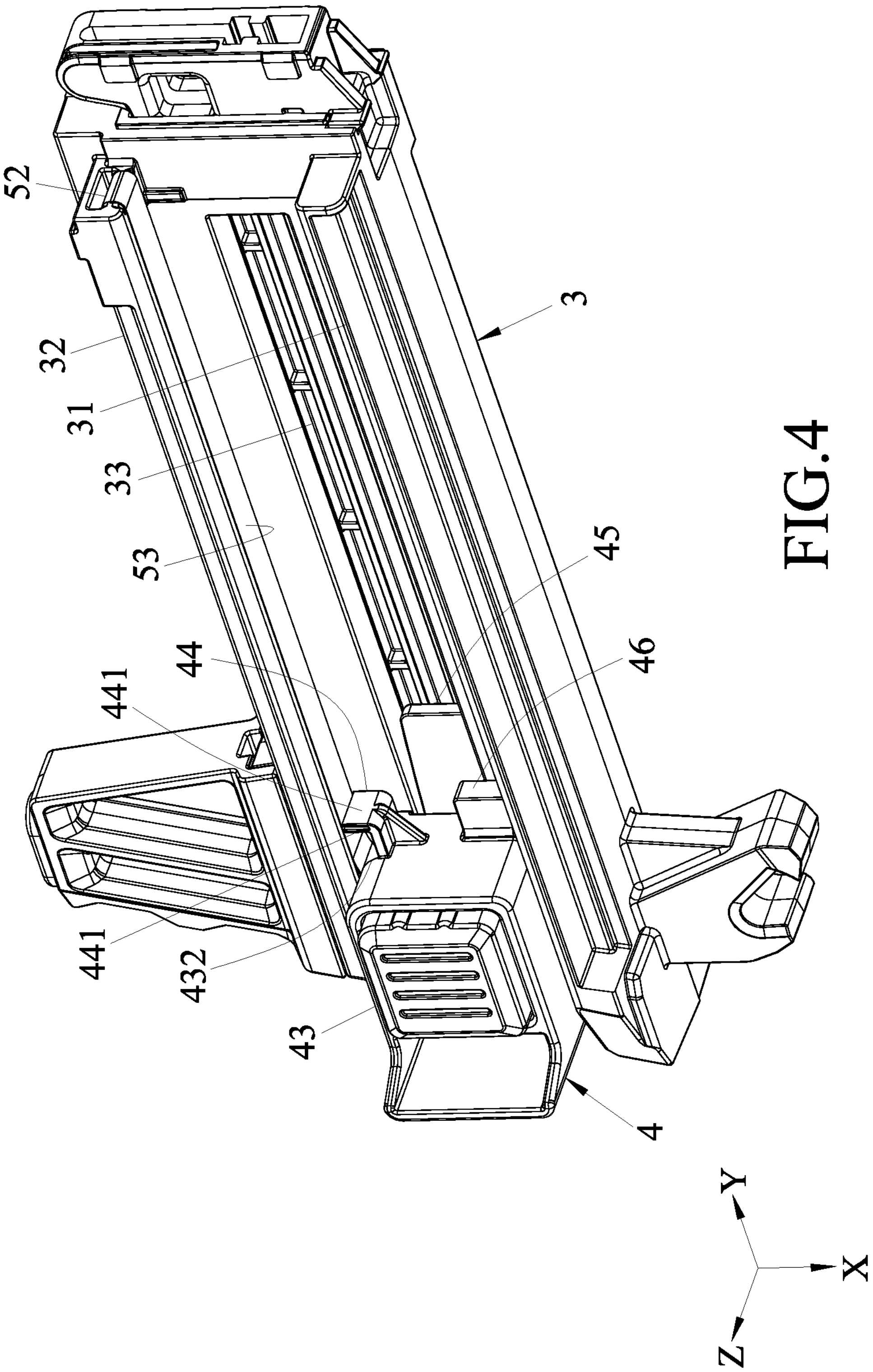
FIG. 4 is a perspective view illustrating a nail-pressing member of the embodiment being in a nail-loaded position.

Referring to FIGS. 2 to 4, an embodiment of a dustproof magazine of the present disclosure is adapted to be mounted in a nail gun 2. The nail gun 2 includes a gun body 21 and a muzzle unit 22. The muzzle unit 22 extends in a first direction (X), and includes a muzzle seat 220 that is connected to the gun body 21 and the dustproof magazine, a muzzle 221 that is slidable along the muzzle seat 220, and a blocking member 222 that is mounted to the gun body 21 and that is swingable relative to the muzzle 221. The muzzle 221 has a nail-discharging outlet 223 for discharging nails (not shown) that are received in the dustproof magazine.

When the blocking member 222 swings to partially extend into the muzzle 221, the nails are blocked from being discharged out of the nail-discharging outlet 223. As shown in FIG. 3, the dustproof magazine of the embodiment includes a magazine body 3, a nail-pressing member 4, and a scroll spring 5.

The magazine body 3 includes a first rail wall 31 and a second rail wall 32 that are spaced apart from each other in the first direction (X), that extend in a second direction (Y) perpendicular to the first direction (X), and that are adapted to be disposed respectively distal from and adjacent to the nail-discharging outlet 223 in the first direction (X). The magazine body 3 has a nail slot 33 that is formed between the first rail wall 31 and the second rail wall 32, and that is adapted for receiving the nails which are arranged in a row.

Figure 5:
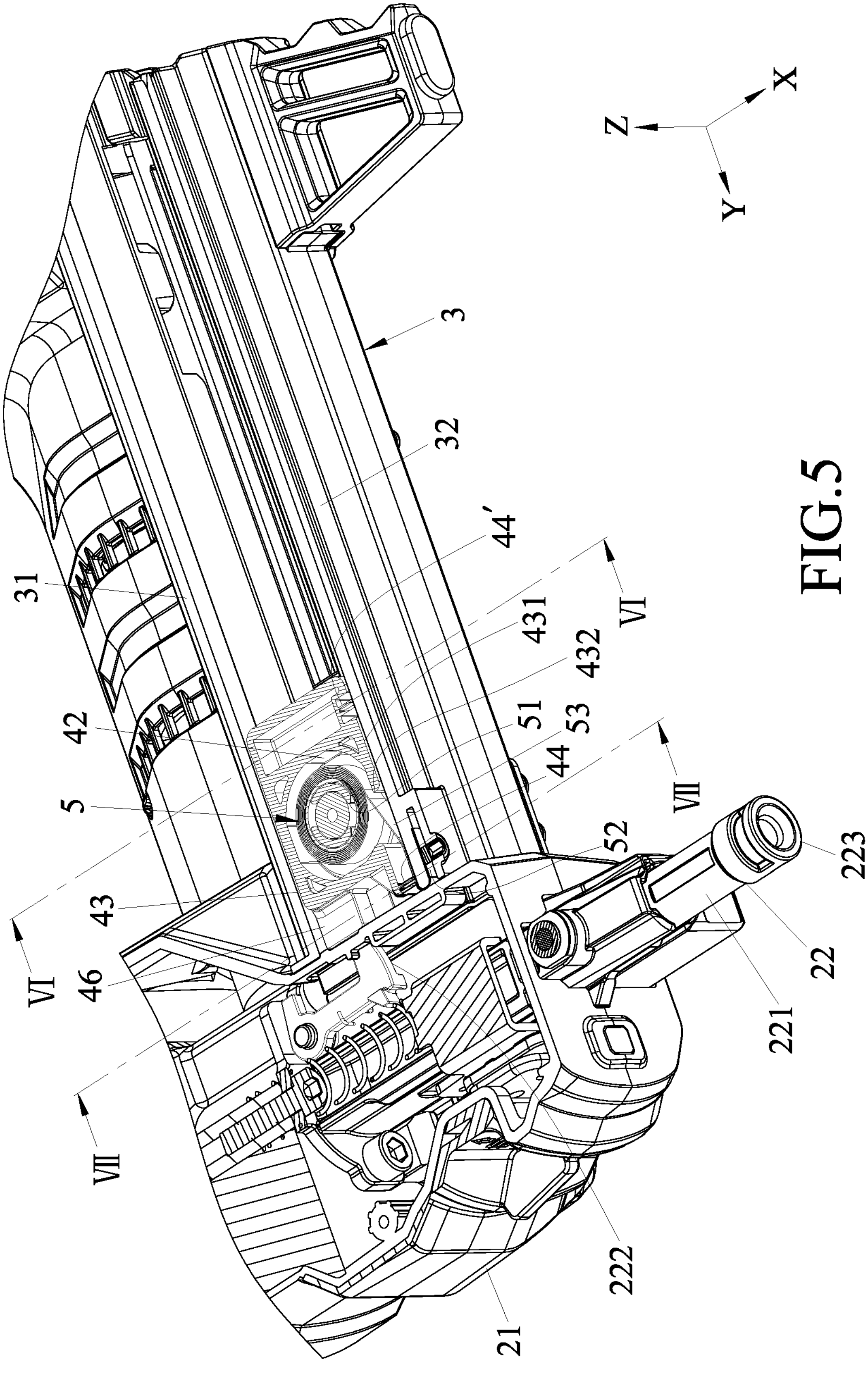
FIG. 5 is a fragmentary cutaway perspective view similar to FIG. 2, but illustrating the nail-pressing member of the embodiment being in a nail-unloaded position.
Figure 6:
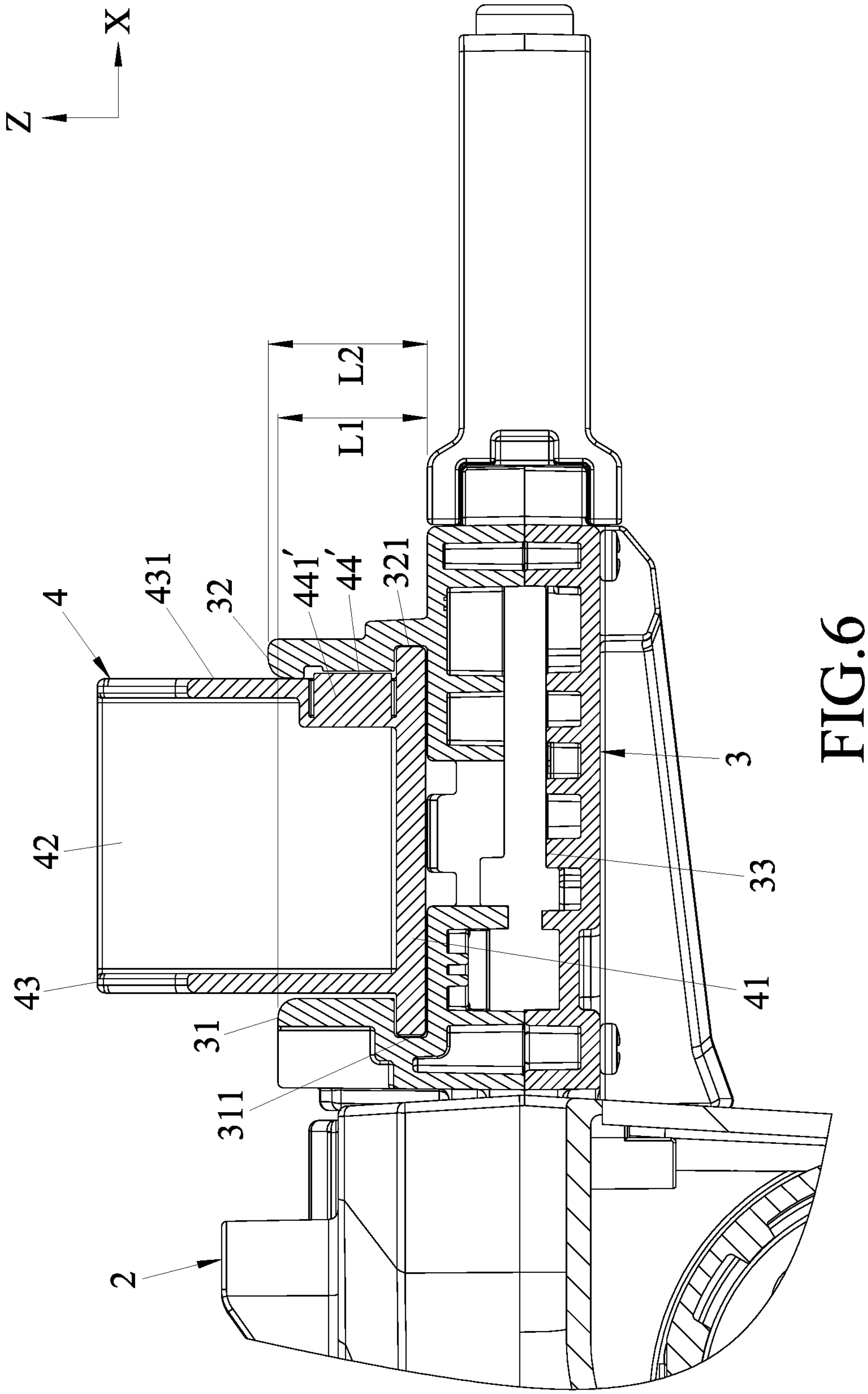
FIG. 6 is a fragmentary sectional view taken along line VI-VI in FIG. 5.
Figure 7:
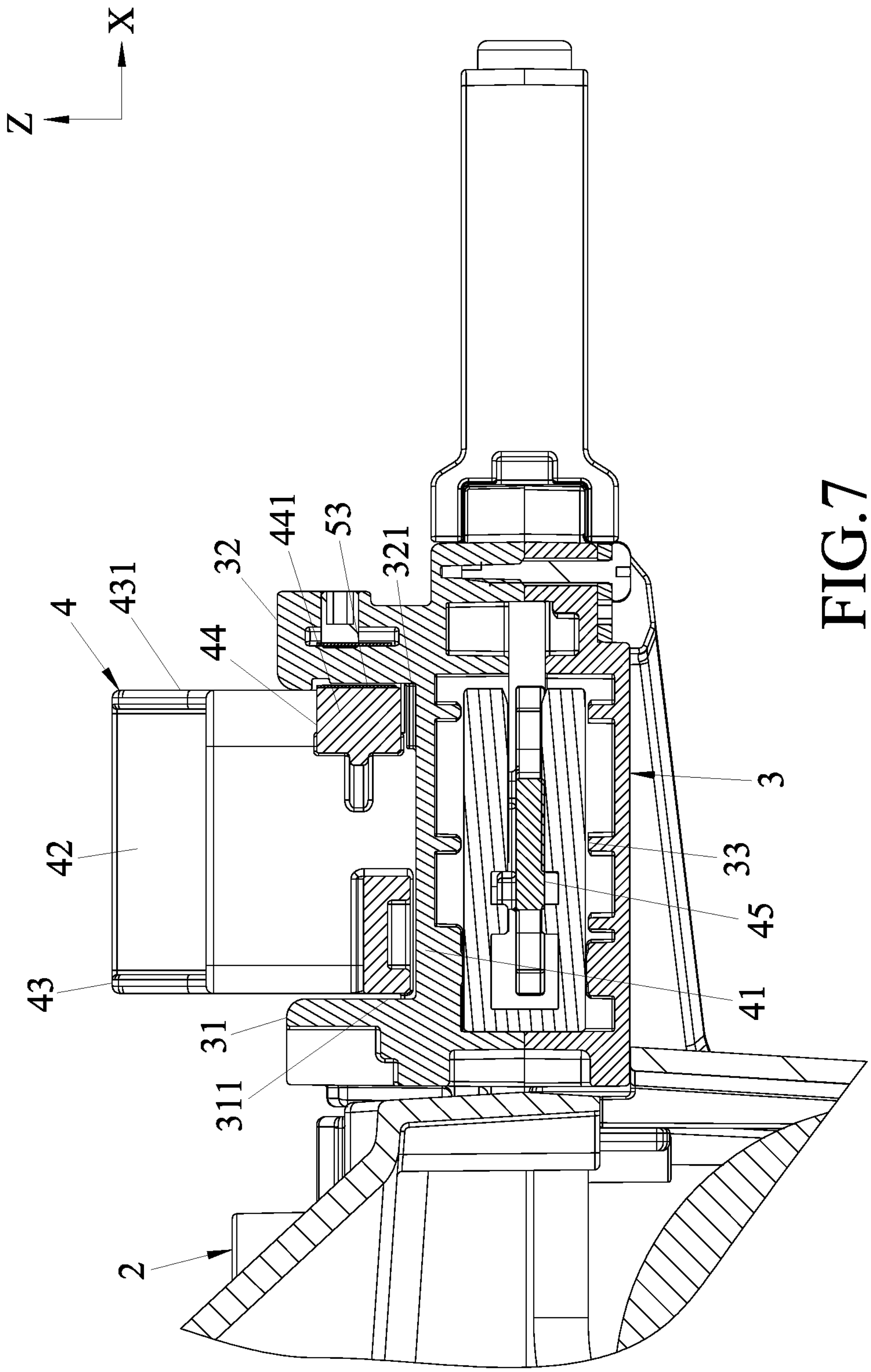
FIG. 7 is a fragmentary sectional view taken along line VII-VII in FIG. 5.

Further referring to FIGS. 5 to 7, the first rail wall 31 has a first groove 311 opening toward the second rail wall 32, and has a height (L1) in a third direction (Z) that is perpendicular to the first direction (X) and the second direction (Y).

The second rail wall 32 has a second groove 321 opening toward the first rail wall 31, and has a height (L2) in the third direction (Z) that is substantially equal to the height (L1). In this embodiment, the height (L2) is slightly greater than the height (L1).

The nail-pressing member 4 is mounted between the first rail wall 31 and the second rail wall 32, is movable along an axis that extends in the second direction (Y), and is adapted to press the nails into the muzzle unit 22. The nail-pressing member 4 includes a main body, a first scraper set 44, and a second scraper set 44'. The main body of the nail-pressing member 4 includes a slide plate 41, a surrounding wall 43, a nail-pressing piece 45, and a protrusion 46. The slide plate 41 slidably engages the first groove 311 and the second groove 321 such that the nail-pressing member 4 is slidable along the first rail wall 31 and the second rail wall 32. The surrounding wall 43 is connected to the slide plate 41 and defines a scroll spring chamber 42 therein. The nail-pressing piece 45 is connected to the slide plate 41, is inserted in the nail slot 33, and is adapted to press the nails received in the nail slot 33 into the muzzle unit 22. The protrusion 46 extends from the surrounding wall 43 toward the blocking member 222 in the second direction (Y). Specifically, the first and second scraper sets 44, 44' extend from the surrounding wall 43 toward the second rail wall 32 and away from each other along an axis that extends in the second direction (Y), and are for scraping off foreign matters such as dust.

The surrounding wall 43 has an outer surface 431 that is opposite to the scroll spring chamber 42, and a slot 432 that is in spatial communication with the scroll spring chamber 42 and that opens toward the second rail wall 32.

Each of the first and second scraper sets 44, 44' includes two scraper blades 441, 441' that are spaced apart from each other in the second direction (Y).

In this embodiment, the nail-pressing member 4 is slidable relative to the muzzle unit 22 between a nail-loaded position (see FIG. 4), where the nail-pressing member 4 is away from the muzzle unit 22 so that the nail slot 33 may be fully loaded with nails, and a nail-unloaded position (see FIG. 5), where the nail-pressing member 4 is adjacent to the muzzle unit 22. During movement of the nail-pressing member 4 from the nail-loaded position to the nail-unloaded position, the nail-pressing piece 45 is adapted to press the nails received in the nail slot 33 into the muzzle seat 220 one by one. When the nail-pressing member 4 is in the nail-unloaded position, the blocking member 222 partially extends into the muzzle 221 as being pushed by the protrusion 46 to block the muzzle 221 from sliding along the muzzle seat 220, such that striking of the nails out of the nail-discharging outlet 223 is disabled.

The scroll spring 5 is connected between the magazine body 3 and the nail-pressing member 4 for biasing the nail-pressing member 4 to move toward the muzzle unit 22. In this embodiment, the scroll spring 5 includes a first end portion 51 that is connected to the nail-pressing member 4, a second end portion 52 that is opposite to the first end portion 51 and that is connected to the second rail wall 32 of the magazine body 3, and a strip portion 53 that is disposed between the first end portion 51 and the second end portion 52.

Specifically, in this embodiment, the first end portion 51 is disposed in the scroll spring chamber 42, the second end portion 52 is disposed outside the scroll spring chamber 42 and is connected to one end of the second rail wall 32 that is adjacent to the muzzle unit 22, and the strip portion 53 extends through the slot 432 of the surrounding wall 43.

It should be noted that, in some embodiments of the present disclosure, the position of the slot 432 in the surrounding wall 43 may vary as long as the strip portion 53 extends through the slot 432.

In this embodiment, movement of the nail-pressing member 4 away from the muzzle unit 22 (i.e., from the nail-unloaded position to the nail-loaded position) drives the scroll spring 5 to resiliently convert from a winding state into an unwinding state. When the scroll spring 5 is in the winding state, most part of the strip portion 53 is retained in the scroll spring chamber 42. When the scroll spring 5 is in the unwinding state, the strip portion 53 unwinds and extends along the second rail wall 32. Conversion of the scroll spring 5 from the unwinding state into the winding state by a restoring force of the scroll spring 5 moves the nail-pressing member 4 toward the muzzle unit 22 (i.e., toward the nail-unloaded position). The first scraper set 44 is in contact with the strip portion 53 during the abovementioned movement of the nail-pressing member 4. It is worth noting that the second scraper set 44' that is spaced apart from the first scraper set 44 is in contact with the second rail wall 32. In this way, during the movement of the nail-pressing member 4 between the nail-loaded and nail-unloaded positions, the scraper blades 441 of the first scraper set 44 may scrape foreign matters off the strip portion 53 of the scroll spring 5 and the scraper blades 441' of the second scraper set 44' may scrape foreign matters off the second rail wall 32.

When the nail gun 2 is held upright and the nail-discharging outlet 223 opens upwardly to strike the nails into an object (not shown) disposed above the nail gun 2, the second rail wall 32 may block foreign matters from entering the magazine body 3. During such nail-striking process, the nail-pressing member 4 moves from the nail-loaded position to the nail-unloaded position, and the first scraper set 44 scrapes foreign matters off the strip portion 53 and the second scraper set 44' scrapes foreign matters off the second rail wall 32.

Similarly, when the magazine body 3 is loaded with nails so the nail-pressing member 4 is moved from the nail-unloaded position to the nail-loaded position, the first and second scraper sets 44, 44' may also scrape foreign matters off the strip portion 53 and the second rail wall 32, respectively.

It should be noted that the quantity of the scraper blades 441, 441' of each of the first and second scraper sets 44, 44' is not limited to two, and may be one or more in other variations of the embodiment as long as the effect of scraping off foreign matters is effectively achieved.

Through the above description, the advantages of the embodiment of the dustproof magazine of the present disclosure may be summarized as follows.

First, by virtue of the configuration of the second rail wall 32 that is disposed adjacent to the nail-discharging outlet 223 in the first direction (X) and that has the height (L2) slightly greater than that of the first rail wall 31 in the third direction (Z), the majority of foreign matters falling off the object that is above the nail gun 2 during the nail-striking process may be blocked by the second rail wall 32 from entering the magazine body 3 or being accumulated on the strip portion 53 of the scroll spring 5 that extends along the second rail wall 32 during the conversion of the scroll spring 5 between the winding and unwinding states.

Second, the first and second scraper sets 44, 44' are capable of respectively scraping foreign matters off the strip portion 53 and the second rail wall 32 so that accumulation of foreign matters thereon may be prevented, and a relatively smooth movement of the nail-pressing member 4 during the striking process of the nail gun 2 may be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dustproof magazine adapted to be mounted in a nail gun, the nail gun including a muzzle unit that extends in a first direction, and that has a nail-discharging outlet, said dustproof magazine comprising:

a magazine body adapted for receiving a plurality of nails therein, and including a first rail wall and a second rail wall that are spaced apart from each other in the first direction, that extend in a second direction transverse to the first direction, and that are adapted to be disposed respectively distal from and adjacent to the nail-discharging outlet of the muzzle unit in the first direction;

a nail-pressing member mounted between said first rail wall and said second rail wall, movable along an axis that extends in the second direction, and adapted to press the nails into the muzzle unit, said nail-pressing member including a main body and a first scraper set that extends from said main body; and a scroll spring connected between said magazine body and said nail-pressing member for biasing said nail-pressing member to move toward the muzzle unit, and including a first end portion that is connected to said nail-pressing member, a second end portion that is opposite to said first end portion and that is connected to said second rail wall, and a strip portion that is disposed between said first end portion and said second end portion;

wherein movement of said nail-pressing member away from said muzzle unit drives said scroll spring to resiliently convert from a winding state into an unwinding state, where said strip portion unwinds and extends along said second rail wall;

wherein conversion of said scroll spring from the unwinding state into the winding state by a restoring force of said scroll spring moves said nail-pressing member toward said muzzle unit;

wherein said first scraper set is in contact with said strip portion during the movement of said nail-pressing member for serapping scraping foreign matters off said strip portion.

2. The dustproof magazine as claimed in claim 1, wherein said nail-pressing member further including includes a second scraper set that extends from said main body and that is in contact with said second rail wall for scraping foreign matters off said second rail wall.

3. The dustproof magazine as claimed in claim 2, wherein:

each of said first scraper set and said second scraper set includes two scraper blades spaced apart from each other in the second direction; and the second direction is substantially perpendicular to the first direction.

4. The dustproof magazine as claimed in claim 1, wherein:

said first rail wall has a height in a third direction substantially equal to a height of said second rail wall; and the third direction is perpendicular to the second direction and the first direction.

5. The dustproof magazine as claimed in claim 4, wherein said height of said second rail wall is slightly greater than said height of said first rail wall.

6. The dustproof magazine as claimed in claim 1, wherein said second end portion of said scroll spring is connected to one end of said second rail wall that is adjacent to the muzzle unit.

7. The dustproof magazine as claimed in claim 1, wherein:

said first rail wall has a first groove open toward said second rail wall;

said second rail wall has a second groove open toward said first rail wall; and said main body of said nail-pressing member includes a sliding plate that slidably engages said first groove and said second groove.

8. The dustproof magazine as claimed in claim 7, wherein said main body of said nail-pressing member further includes a surrounding wall connected to said sliding plate and defining a scroll spring chamber;

said first end portion of said scroll spring is disposed in said scroll spring chamber, said strip portion of said scroll spring extending through said surrounding wall, said second end portion being disposed outside said scroll spring chamber; and said first scraper set extends from said surrounding wall.

9. The dustproof magazine as claimed in claim 8, wherein said surrounding wall has a slot in spatial communication with said scroll spring chamber and open toward said second rail wall, said strip portion of said scroll spring extends through said slot.

* * * * *